United States Patent [19]

Montgomery

[11] Patent Number: 4,538,212
[45] Date of Patent: Aug. 27, 1985

[54] ELECTROLYTIC CAPACITOR

[75] Inventor: William P. Montgomery, Pownal, Vt.

[73] Assignee: Sprague Electric Company, North Adams, Mass.

[21] Appl. No.: 635,972

[22] Filed: Jul. 30, 1984

[51] Int. Cl.³ .............................................. H01G 9/00
[52] U.S. Cl. ...................................... 361/433; 29/570
[58] Field of Search .......................... 361/433; 29/570; 174/50.61, 50.63

[56] References Cited

U.S. PATENT DOCUMENTS 3,255,386 6/1966 Millard et al. ....................... 361/433
3,600,017 8/1971 Scherer ........................ 287/189.365
3,624,458 11/1971 Howell et al. ....................... 361/433

FOREIGN PATENT DOCUMENTS 1514872 6/1978 United Kingdom .

Primary Examiner—L. T. Hix
Assistant Examiner—Douglas S. Lee

[57] ABSTRACT

An electrolytic capacitor which has a porous valve-metal anode pellet, a tri-metal housing, and a hermetic glass-metal seal, has a thin layer of a ductile and solderable metal on the inner surface of the housing adjacent the seal. This layer extends from the mouth of the housing to at most the bottom of the glass-metal seal which is sealed, preferably by soldering, to the housing.

8 Claims, 1 Drawing Figure

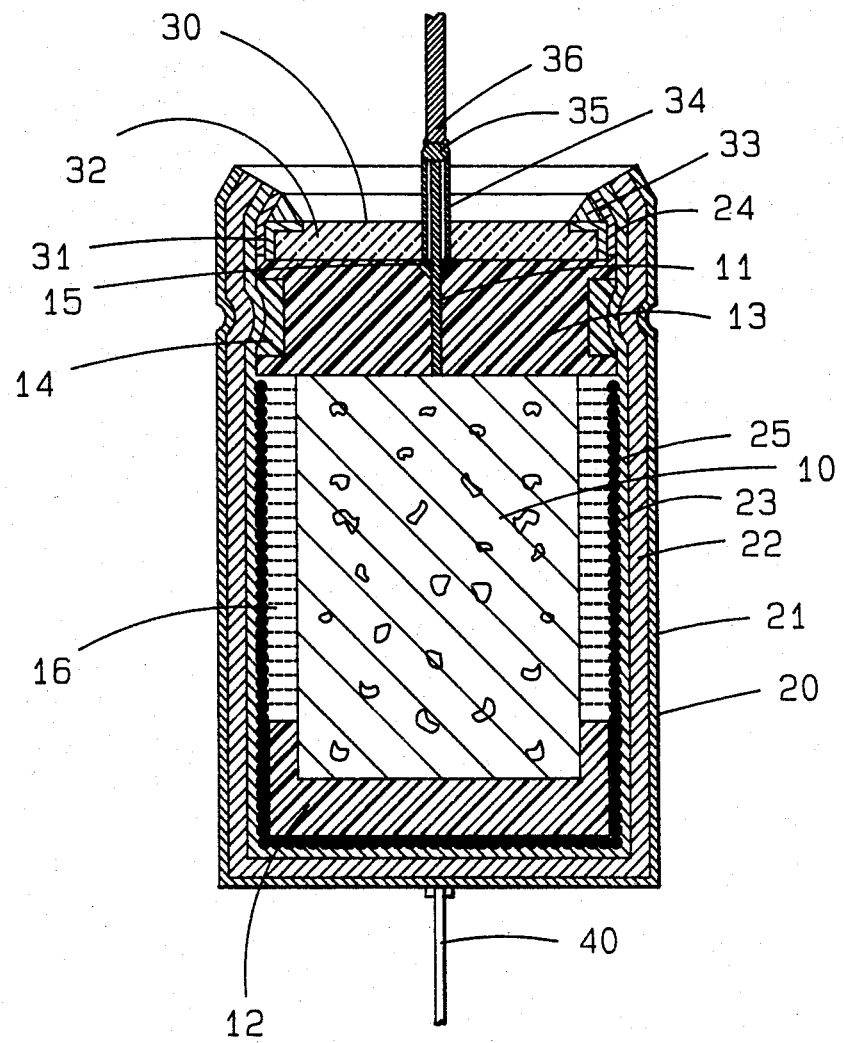

ELECTROLYTIC CAPACITOR

BACKGROUND OF THE INVENTION

This invention relates to an electrolytic capacitor having a porous anodized pellet anode, a tri-metal can housing, and having a glass-metal hermetic seal, in which the can interior bears a thin layer of a ductile solderable metal extending from the mouth of the can to at most the bottom of the seal. The outer metal ring of the glass-metal seal is sealed to this layer, preferably by soldering.

In a glass-metal compression seal, the outer compression ring is made of a metal different than tantalum and has a coefficient of expansion which is about twice that of tantalum. In the past, the ring has been plated or clad with a metal clad resistant to corrosion by the electrlolyte used, frequently sulfuric acid.

Silver cathode cases have enjoyed popularity in tantalum capacitors, but migration of silver and plating out of silver on the anode from the cathode if reverse voltage is applied has been a serious problem. For this reason a tantalum case or one with a tantalum interior is preferred, but there have been problems in joining the seal ring to the tantalum case. It is to this problem that the present invention is addressed.

SUMMARY OF THE INVENTION

It is a feature of this invention that in an electrolytic capacitor having a porous valve-metal pellet anode, a hermetic glass-metal seal, and a tri-metal can as cathode, there is a thin layer of a ductile, solderable metal which extends from the mouth of the can to at most the bottom of the glass-metal seal. The seal is firmly attached to this layer, preferably by soldering.

The tri-metal cathode can is preferably that described by D. G. Rogers in copending application Ser. No. 533,678, filed Sept. 19, 1983, and assigned to the assignee of the present invention. This can is drawn from a tantalum-copper-nickel composite with tantalum forming the inner surface of the can and nickel, the outer.

When the glass-metal seal is a compression seal, e.g., the glass is compressed by a ring against the central tube, the ring generally has a coefficient of expansion (or contraction) about twice that of the glass and central tube. For a tantalum capacitor and seal, this ring is frequently nickel, Monel, stainless steel, etc.

When the cathode can is tantalum or has a tantalum interior, the compression ring has to be joined to the tantalum which poses some problems. By providing a thin layer or wash of a solderable metal at the mouth of the can, the metal compression ring can be joined to the tantalum can much more easily. However, this layer must not extend beyond the seal, as it might also plate onto the anode under reverse voltage conditions.

With the tri-metal can, the inner tantalum layer is relatively thin, and a weld to it requires even more care and is costly. While the metal wash can be applied to just the interior of the can mouth, it is preferable to use a metal which is ductile as well as solderable and to apply the wash over the tantalum surface before that can is drawn. If this is done, this metal acts as a lubricant during the roll bonding and the drawing of the can. The wash is then removed from all but the mouth area. Other methods of providing a ring of ductile solderable metal could be used, but the preferred method is to apply a wash, draw the can, and remove all but a ring of wash.

BRIEF DESCRIPTIONS OF THE DRAWINGS

The sole FIGURE is a cross-section of the capacitor of the present invention.

DESCRIPTION OF THE PREFERRED EMBODIMENTS

An electrolytic capacitor has a porous anodized valve-metal pellet anode 10, preferably tantalum, with an associated riser 11 and is seated in an insulating plastic gasket 12 located in the bottom of cathode can 20. Riser 11 passes through an upper insulating gasket 13 which is compressed against anode 10 and in turn compresses it against bottom gasket 12. A resilient O-ring 14 surrounds a portion of gasket 13 and is compressed between it and can 20. A second resilient O-ring 15 surrounds riser 11 where it emerges from the top of gasket 13 and is compressed against it by hermetic seal 30.

Can 20 is preferably a tri-metal can consisting of an outer layer of nickel 21, an intermediate layer of copper 22, and an inner layer of tantalum 23 which forms the interior surface of can 20. A layer of finely-divided carbon 25 overlies tantalum layer 23. Electrolyte 16 fills the container to the bottom of gasket 13.

At the upper end of can 20, tantalum layer 23 bears a thin layer of ductile solderable metal 24 which extends on the interior of can 20 from its mouth to at most the bottom of hermetic seal 30.

Hermetic seal 30 has a central hollow tube 34 through which anode riser 11 passes and is sealed off at weld 35. A mass of glass 32 surrounds tube 34 and is compressed against it by metal ring 31. Ring 31 is sealed to can 20 by solder 33 between the upper edge of ring 31 and metal layer 24. Anode lead 36 and cathode lead 40 complete the capacitor.

Metal layer 24 may be one of a variety of ductile solderable metals, e.g., copper, silver, bronze, lead, tin, etc., but is preferably copper. Metal layer 24 extends at most to the lower edge of seal 30 and preferably not that far so that it will not come into contact with electrolyte 16 which might work its way around gasket 13 or along riser 11. It is easy to solder to copper, the preferred metal, and its presence facilitates the sealing of capacitors having a tantalum or part tantalum case and a glass-metal compression seal.

What is claimed is:

1. In an electrolytic capacitor having a porous anodized valve-metal pellet anode, a hermetic glass-metal seal having a metal ring forming its periphery and a housing in the form of a can, the improvement comprises a thin layer of a ductile and solderable metal on the inner surface of the mouth of said can which extends into said can at most as far as the bottom of said seal.

2. A capacitor according to claim 1 wherein said valve-metal is tantalum and said can is at least in part made of tantalum.

3. A capacitor according to claim 2 wherein said thin layer is bonded to a tantalum surface.

4. A capacitor according to claim 2 wherein said can is a tri-metal clad can having a tantalum inner surface.

5. A capacitor according to claim 1 wherein said ring is sealed to said thin layer.

6. A capacitor according to claim 5 wherein said ring is soldered to said thin layer.

7. A capacitor according to claim 1 wherein said thin layer is copper.

8. A capacitor according to claim 1 wherein said thin metal extends only partially the depth of said seal.

* * * * *